United States Patent
Hollström et al.

(10) Patent No.: US 7,130,608 B2
(45) Date of Patent: Oct. 31, 2006

(54) METHOD OF USING A COMMUNICATIONS DEVICE TOGETHER WITH ANOTHER COMMUNICATIONS DEVICE, A COMMUNICATIONS SYSTEM, A COMMUNICATIONS DEVICE AND AN ACCESSORY DEVICE FOR USE IN CONNECTION WITH A COMMUNICATIONS DEVICE

(75) Inventors: Magnus Hollström, Lund (SE); Anders Borgström, Skanör (SE)

(73) Assignee: Telefonaktiegolaget LM Ericsson (publ), Stockholm (SE)

( * ) Notice: Subject to any disclaimer, the term of this patent is extended or adjusted under 35 U.S.C. 154(b) by 623 days.

(21) Appl. No.: 09/726,987

(22) Filed: Nov. 30, 2000

(65) Prior Publication Data

US 2001/0041588 A1 Nov. 15, 2001

(30) Foreign Application Priority Data

Dec. 3, 1999 (EP) .................................. 99610075

(51) Int. Cl.
*H04Q 7/22* (2006.01)
*H04M 1/725* (2006.01)

(52) U.S. Cl. .................... 455/403; 455/412.1; 455/466
(58) Field of Classification Search ............... 455/3.01, 455/3.03, 3.04–6.06, 412.1, 414.1, 414.4, 455/518, 556.1, 556.2, 569.1, 575.2, 413, 455/456, 466, 412.2, 414.3; 379/68, 85, 379/87, 88.16, 88.19, 88.26, 88.22, 88.1, 379/88.27

See application file for complete search history.

(56) References Cited

U.S. PATENT DOCUMENTS

| | | | |
|---|---|---|---|
| 5,544,230 A * | 8/1996 | Megyesi | 379/67.1 |
| 5,572,442 A | 11/1996 | Schulhof et al. | 364/514 |
| 5,841,979 A * | 11/1998 | Schulhof et al. | 709/237 |
| 5,914,941 A | 6/1999 | Janky | 370/313 |
| 6,138,036 A * | 10/2000 | O'Cinneide | 455/557 |
| 6,148,175 A * | 11/2000 | Freedland | 455/3.06 |
| 6,167,251 A * | 12/2000 | Segal et al. | 455/406 |
| 6,192,340 B1 * | 2/2001 | Abecassis | 704/270 |
| 6,366,785 B1 * | 4/2002 | Saarela et al. | 455/466 |
| 6,367,019 B1 * | 4/2002 | Ansell et al. | 713/201 |
| 6,381,452 B1 * | 4/2002 | Tien et al. | 455/344 |
| 6,400,804 B1 * | 6/2002 | Bilder | 379/76 |
| 6,446,127 B1 * | 9/2002 | Schuster et al. | 709/227 |
| 6,473,630 B1 * | 10/2002 | Baranowski et al. | 455/572 |
| 6,502,194 B1 * | 12/2002 | Berman et al. | 713/201 |
| 6,546,241 B1 * | 4/2003 | Iyengar et al. | 455/412.1 |

FOREIGN PATENT DOCUMENTS

| | | |
|---|---|---|
| EP | 0762 711 A2 | 3/1997 |
| EP | 0 762 711 A2 * | 12/1997 |
| WO | WO 99/03294 | 1/1999 |
| WO | WO 99/43136 | 8/1999 |

* cited by examiner

*Primary Examiner*—Simon Nguyen

(57) ABSTRACT

A method of using a first communications device, such as a mobile telephone, together with at least one other communications device, such as a telephone, comprises the steps of playing back audio signals in the first communications device, transmitting the same audio signals to the other communications device, and playing back the audio signals in the other communications device. By transmitting the audio signals played back in the first communications device to the other device and playing them back there, shared audio listening is achieved and in this way the communications devices can be used also for the shared listening to e.g. music. Thus it is possible for two persons present at different locations to listen to the same audio signals simultaneously or at least almost simultaneously.

21 Claims, 5 Drawing Sheets

Figure 1:
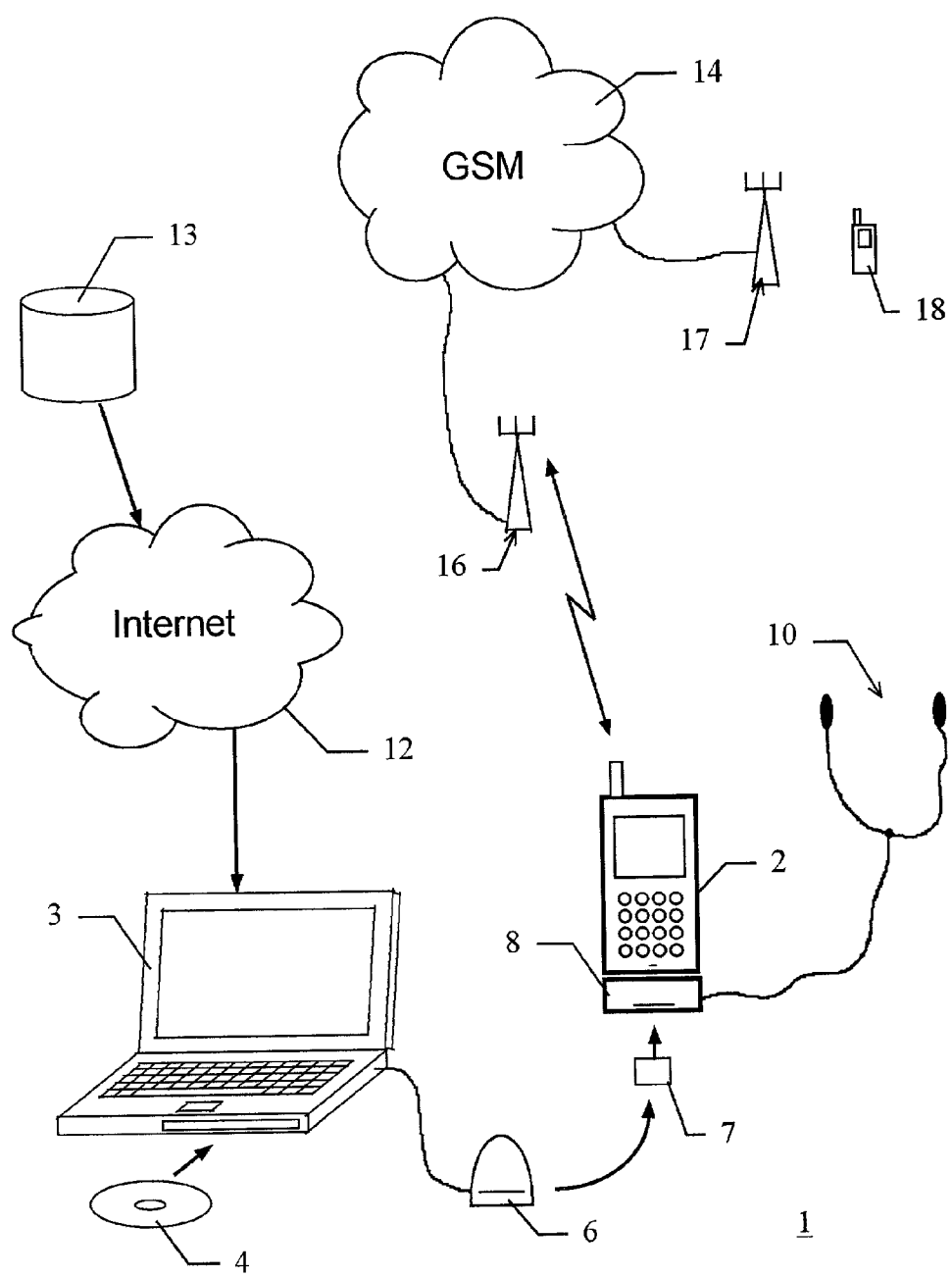

METHOD OF USING A COMMUNICATIONS DEVICE TOGETHER WITH ANOTHER COMMUNICATIONS DEVICE, A COMMUNICATIONS SYSTEM, A COMMUNICATIONS DEVICE AND AN ACCESSORY DEVICE FOR USE IN CONNECTION WITH A COMMUNICATIONS DEVICE

The invention relates to a method of using a first communications device together with at least one other communications device. The invention further relates to a communications system comprising a first communications device and at least one other communications device; a communications device adapted to be used in a communications system comprising at least one other communications device; and an accessory device for use in connection with a first communications device adapted to be used in a communications system comprising at least one other communications device.

Portable playback devices for use with e.g. audio cassettes or compact discs (CD's) have been known for many years and are widely used, because they allow a user to listen to music or other audio information at any place and during transport.

Today, different methods of compressing digitized audio signals significantly are also known, and this situation has led to the fact that portable storage mediums, such as memory cards, of even limited size can store a considerable amount of audio information. Therefore, also portable playback devices for such storage mediums have been made available. As an example, portable playback devices for audio files in MP3 format may be mentioned.

U.S. Pat. No. 5,841,979 discloses a portable digital audio storage and playback apparatus for reception, storage, D/A conversion and playback of digitized and compressed audio files. The compressed audio files may be received at a transfer rate that is at least twice the normal audible playback rate. A similar apparatus is known from U.S. Pat. No. 5,914,941, which mentions that program material can be obtained either through a digital data storage cartridge, which may be removable, or through electronic data transfer from cable TV or similar sources.

However, these devices are designed to be used exclusively for playback of audio information. Many users have a need for other functions which these devices are not able to fulfil, and, thus, these users have to carry additional devices in order to have their needs fulfilled.

It is also known, e.g. from WO 99/03294, to share a common headset between an audio device and a communications device in the form of a radio telephone, such that the headset is used for telephone conversation when the telephone is active, and switched to the audio device when the telephone is not active. The audio device and the telephone may also share a common housing as a single device, which is easier and lighter to carry than two individual devices separately. The audio device is either a receiver for public audio broadcast programs, or it is a compact disc player or a cassette player.

Thus, this known device gives a user the possibility of using the same device for communicating with a conversation partner or for listening to audio signals such as e.g. music. However, many users often want to be able to listen to the audio signals during e.g. a telephone conversation and to allow the conversation partner to listen to the same audio signals simultaneously or at least almost simultaneously, or they just want to share the listening with the other person without having a conversation. Today shared audio listening can only be done acoustically, i.e. the audio signals are reproduced by an audio speaker and the sound is coupled to the microphone of the telephone and thus transmitted to the other person as a part of the voice conversation signals.

Thus, it is an object of the invention to provide a method of communicating of the above-mentioned type, allowing two persons present at different locations to listen to the same audio signals simultaneously or at least almost simultaneously.

According to the invention, this is achieved in that the method comprises the steps of playing back audio signals in the first communications device, transmitting the same audio signals to the other communications device, and playing back said audio signals in the other communications device.

By transmitting the audio signals played back in the first communications device to the other device and playing them back there, shared audio listening is achieved and in this way the communications devices can be used also for the shared listening to e.g. music.

Although the method may be used with any type of communications devices, expedient embodiments, which are stated in claims 2 and 3, are achieved when the first communications device is a mobile telephone and the at least one other communications device is a telephone.

When, as stated in claim 4, the method further comprises the steps of establishing a connection through a network between the mobile telephone and the other telephone, establishing a telephone conversation by transmitting voice signals through a channel in the connection in the network, and transmitting said audio signals from the mobile telephone to the other telephone through the connection in the network, i.e. using a connection established for the transmission of voice conversation signals for the transmission of the audio signals, a solution is obtained in which the transmission and the play back of the audio signals in the other telephone can be controlled from the first communications device, i.e. the mobile telephone.

When, as stated in claim 5, the method further comprises the steps of mixing said voice signals and said audio signals, and transmitting the mixed voice and audio signals from the mobile telephone to the other telephone through a common channel in the connection in the network, a solution is obtained in which no extra transmission capacity is needed for the audio signals. The common channel may be a normal telephone voice channel as stated in claim 6, or it may be a data channel as stated in claim 7.

Alternatively, as stated in claim 8, the method may comprise the steps of transmitting the voice signals through a normal telephone voice channel in the connection in the network, and transmitting said audio signals from the mobile telephone to the other telephone through a data channel parallel to said voice channel in the connection in the network. This allows the audio signals to be treated differently during transmission than the voice conversation signals, thus optimizing the transmission of the two types of signals.

In another embodiment, which is stated in claim 9, the method further comprises the steps of establishing a connection through a network between the mobile telephone and the other telephone, establishing a telephone conversation by transmitting voice signals through a channel in the connection in the network, transmitting said audio signals from a service provider via the network to the mobile telephone, and transmitting the same audio signals from the service provider via the network to the other telephone. In this way no extra signals need to be transmitted between the two telephones.

In an expedient embodiment of the invention, which is stated in claim 10, the audio signals are transmitted in the form of a digitized and compressed audio file. In those cases where a data channel is used for the transmission of the audio signals this embodiment reduces the needed transmission capacity significantly. As stated in claim 11, the digitized and compressed audio file is compressed in the MP3 format, which is a widely used and efficient compression format.

As mentioned, the invention further relates to a communications system comprising a first communications device and at least one other communications device. When, as stated in claim 12, the system is adapted to play back audio signals in said first communications device, transmit the same audio signals to the other communications device, and play back said audio signals in the other communications device, a system having the same advantages as mentioned above for the method is achieved.

As mentioned, the invention further relates to a communications device adapted to be used in a communications system comprising at least one other communications device. When, as stated in claim 13, the device comprises means for playing back audio signals, and means for initiating transmission of the same audio signals to the other communications device, such that said audio signals can be played back in the other communications device, a device providing the above-mentioned advantages is achieved.

As stated in claim 14, the communications device may be a mobile telephone, and in a preferred embodiment, which is stated in claim 15, the mobile telephone may be adapted for use in a public network, such as GSM, GPRS, EDGE or WCDMA.

Alternatively, as stated in claim 16, the communications device may be adapted for use in a wireless shortlink, such as Bluetooth or an infrared connection.

Although the means for playing back audio signals may also be a separate device, such as a cassette player or the like, connectable to the communications device, a preferred embodiment is obtained, when, as stated in claim 17, the means for playing back audio signals is an audio device integrated in the communications device.

As mentioned, the invention further relates to an accessory device for use in connection with a first communications device adapted to be used in a communications system comprising at least one other communications device. When, as stated in claim 18, the accessory device comprises means for playing back audio signals through the first communications device, and means for initiating transmission of the same audio signals to the other communications device, such that said audio signals can be played back in the other communications device, a device providing in combination with the first communications device the above-mentioned advantages is achieved.

Figure 2:
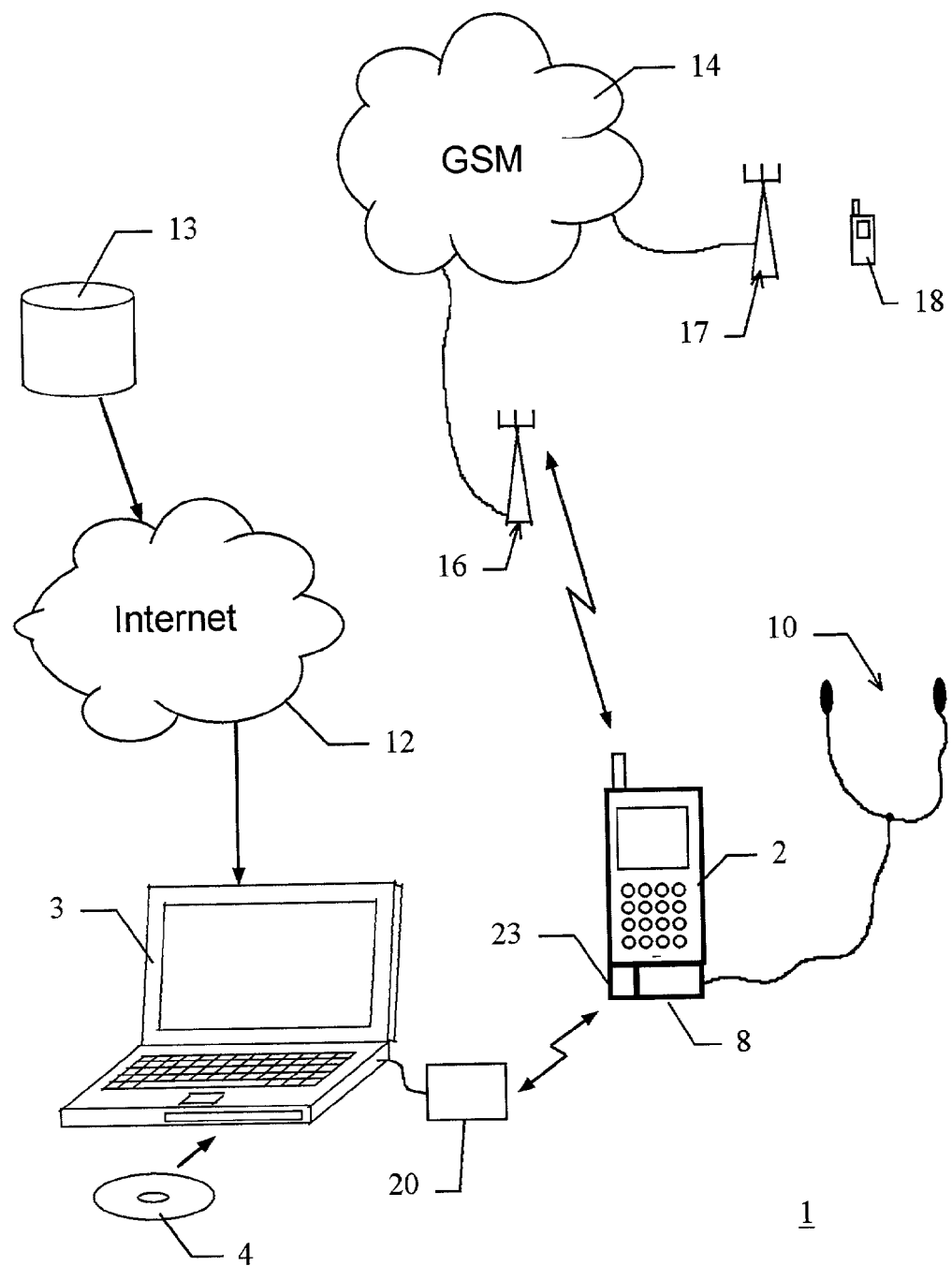
Figure 3:
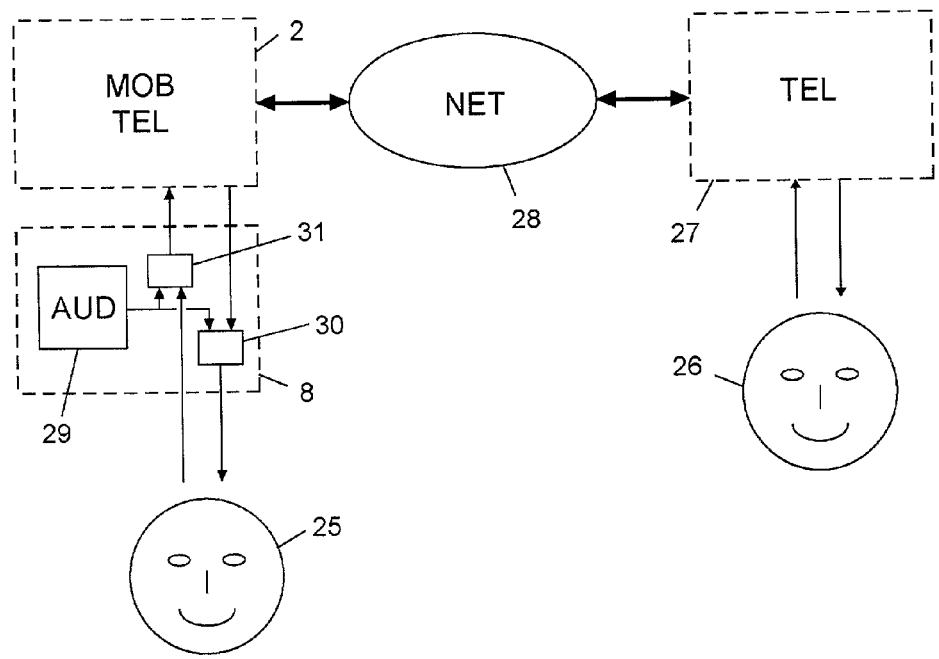
Figure 4:
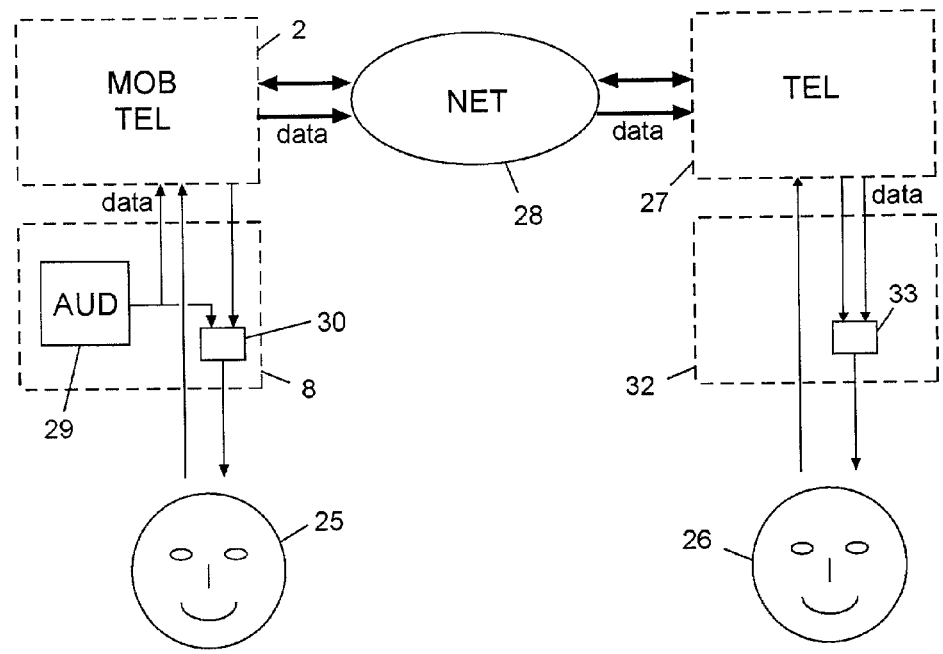
Figure 5:
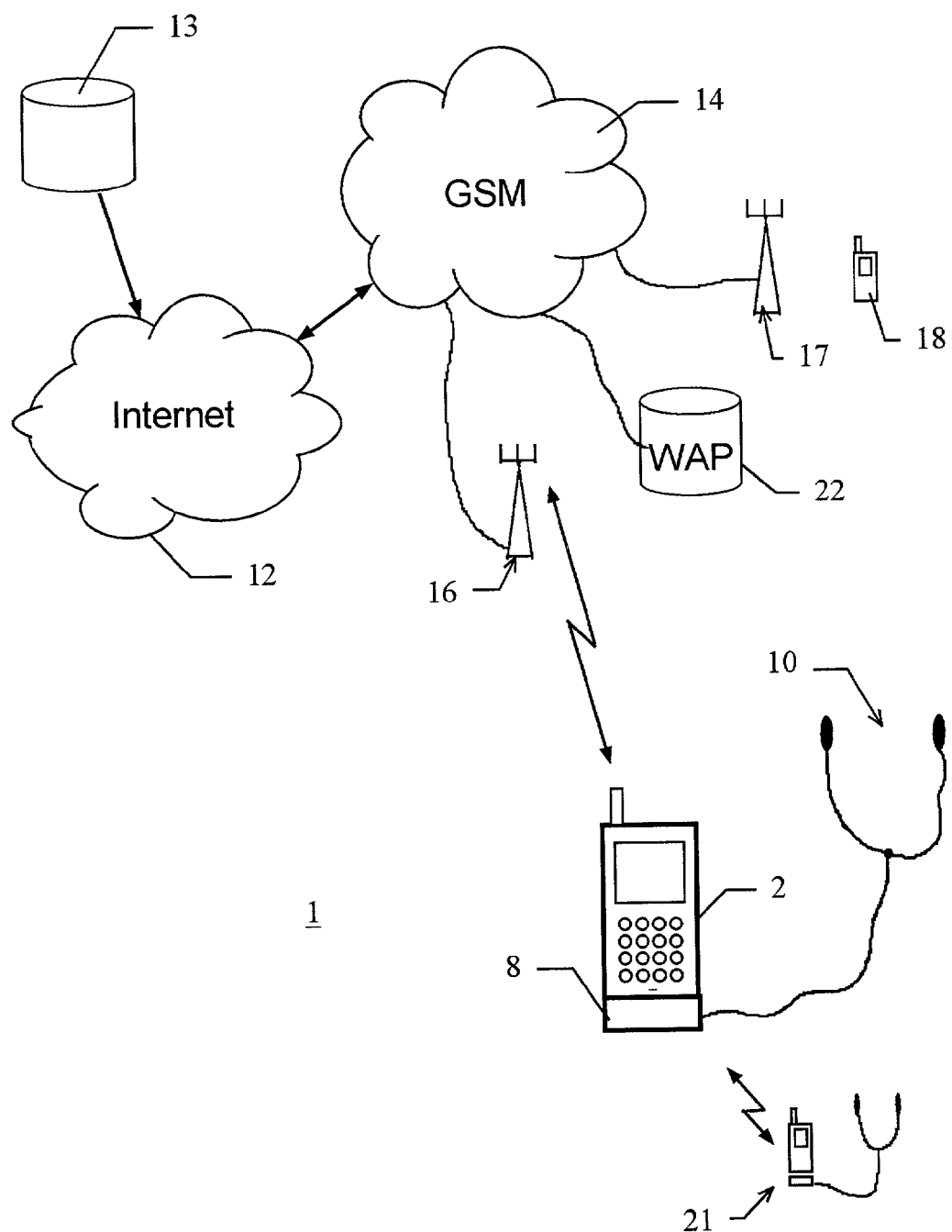
Figure 6:
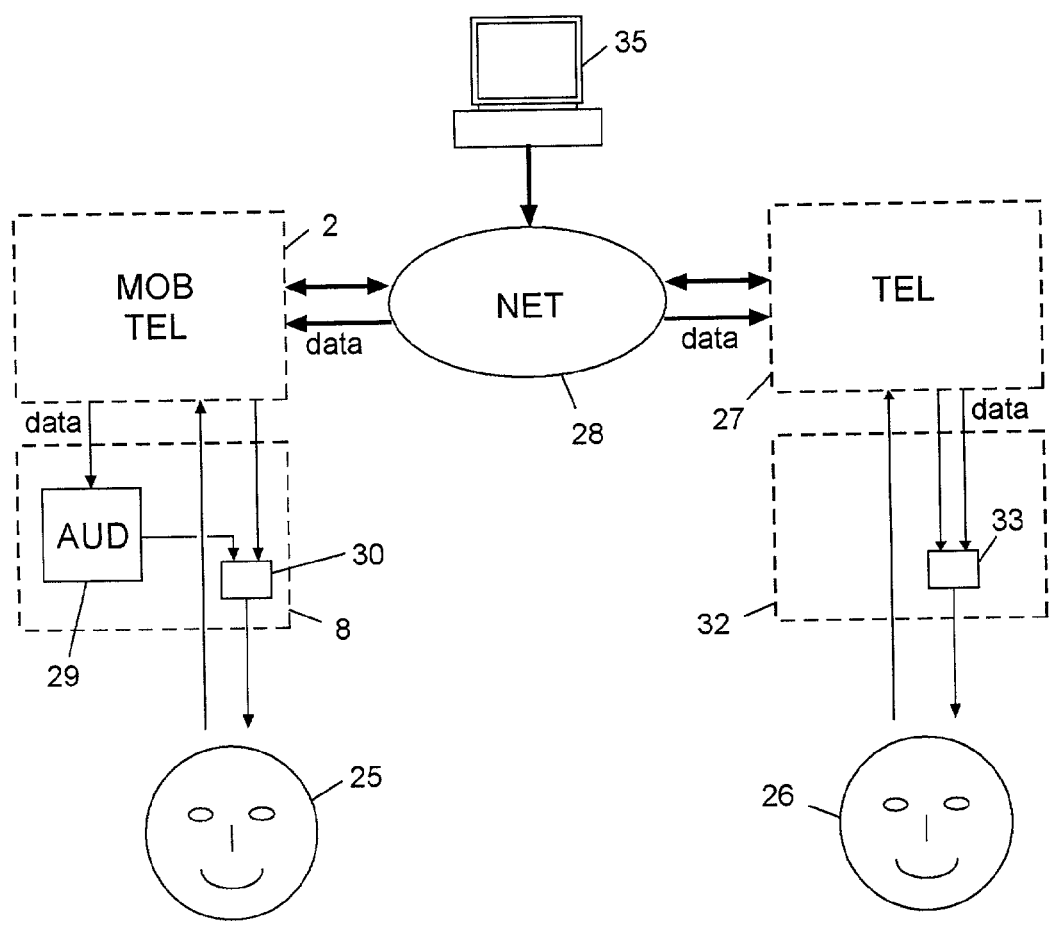

The invention will now be described more fully below with reference to the drawing, in which FIG. 1 shows an example of how a cellular telephone can be used also for audio playback, FIG. 2 shows another example of how a cellular telephone can be used also for audio playback, FIG. 3 shows a first embodiment of shared audio listening, FIG. 4 shows a second embodiment of shared audio listening, FIG. 5 shows downloading of audio files through the network to which the telephone is connected, and FIG. 6 shows a third embodiment of shared audio listening.

FIG. 1 shows an example of a system 1 for providing a cellular telephone 2 with a combination of portable hands-free and hi-fi audio stereo playback. In the example, the telephone 2 is a GSM phone, and through its built-in antenna it communicates with a GSM base station 16 connected to a GSM network 14. It is shown that also other base stations, such as the base station 17, and other GSM phones, such as the phone 18, are connected to the network 14. Thus, the telephone 2 can be used like any other normal GSM phone for two-way communication with other telephones.

In the figure an accessory device in the form of a plug-in device 8 is connected to the phone 2 galvanically at the bottom end of the phone. A sound reproducing unit in the form of a headset 10 is connected to the accessory device 8, but it could just as well be connected directly to the telephone 2. Further, the device 8 has a slot for insertion of a portable storage medium in the form of a memory card or Multi-Media Card 7 on which digitized and compressed audio files are stored, e.g. in MP3 format. The accessory device 8 is adapted to decompress or decode the compressed audio files and playback the resulting audio signals through the headset 10.

It should be noted that the functions of the accessory device 8 may just as well be integrated into the cellular telephone 2 such that one single device contains the telephone as well as the functions described above and below.

If audio contents (e.g. music) are played in the headset and an incoming call appears, the audio playback will be halted or softened, i.e. the sound level reduced, while the conversation is going on. The speech signals received during the conversation are now reproduced in the headset that was used before the call for playback of the audio files stored on the card 7. When the conversation is finished, the audio playback is resumed.

The accessory device 8 also consists of control and monitoring electronics, but it has no Man Machine Interface (MMI), because this part is taken care of by the telephone (display and keyboard) by e.g. using so-called dynamic menues. The phone 2 and the accessory device 8 have an active communication on a serial link. The accessory device 8 can drive most hi-fi headsets on the market, and it also allows routing of a microphone signal for the uplink voice path as well as downlink voice to the headset from the GSM network.

As mentioned, the MP3 audio files are delivered to the accessory device 8 via e.g. a Multi-Media Card that is inserted in a slot in the accessory device 8. An MMC of today may have 32 Mbytes of flash memory, which corresponds to about 30 minutes of hi-fi music or several hours of high quality voice audio.

The figure also shows how to get the compressed audio files into the card 7. A dedicated server 13 belonging to a service provider of compressed audio files is connected to the Internet 12, and the audio content is downloaded from the Internet via a reasonably fast, wired link to a personal computer 3. From the computer 3 it is handed over to the card 7 via an adapter 6 using a normal drag-and-drop manoeuvre on the screen of the personal computer. Alternatively, the content can be automatically transferred from the network and onto the card. The personal computer is connected to the Internet via a normal modem or a faster Ethernet line.

The compressed audio files can also be generated in the personal computer without being downloaded from the Internet. As shown, a compact disc 4 may be inserted into a slot in the computer, and the MP3 content is then obtained by converting from CD format in the personal computer 3 by means of special software. This process is also known as "ripping".

The adapter 6 is any MMC adapter on the market and it can be connected to the personal computer through an RS-232 port, a diskette port, a PC card port, a parallel port or an USB port.

In the example the telephone and the corresponding network are of GSM type, but of course any other cellular system (e.g. WCDMA) may be used as well.

FIG. 2 shows an alternative way of getting the audio information to the telephone 2 or the accessory device 8. A receiver 23 for a wireless shortlink, such as Bluetooth or infrared, is connected to the phone 2 for reception of digitized and compressed audio files, e.g. in MP3 format. Storage media, e.g. in the form of flash memory in the size of 32 Mbytes, on which the digitized and compressed audio files are stored, will be either built-in or removably connected to the device 8. The audio files are downloaded to the personal computer 3 in the same way as shown in FIG. 1, but from the computer the audio content is handed over to a wireless shortlink transmitter 20 using a normal drag-and-drop manoeuvre on the screen of the personal computer. Alternatively, the content can be automatically transferred from the network and to the transmitter. The personal computer is connected to the Internet via a normal modem or a faster Ethernet line.

It should be mentioned that instead of the wireless short link communication between the transmitter 20 and the receiver 23, communication via a wire could be used just as well.

As an alternative to storing the digitized and compressed audio files in a built-in or removable storage medium, the audio content may be "streamed down", which means that the audio signals are received, decompressed and played back continuously. In this case no storage memory is needed.

The parts of FIG. 2 not described above are identical to those of FIG. 1.

FIGS. 1 and 2 have illustrated how the mobile telephone 2 may be used also for playback of audio signals such that the user can listen to e.g. music between telephone calls or even in the background during a telephone call. However, many users also want to be able to share the audio listening with their conversation partner during a telephone call or just to share the listening with the other person without having a conversation.

FIG. 3 shows an example of how this can be done. A user 25 is having a telephone conversation with another person 26. The mobile telephone 2 and the accessory device 8 correspond to those of FIGS. 1 and 2, while the telephone 27 used by the other person 26 may be any type of telephone, mobile or not. The network 28 connecting the two telephones 2 and 27 could represent the GSM network 14 (including the base stations 16 and 17) of FIGS. 1 and 2, but it could also be a combination of several different networks connected together, which would be the case if the telephone 27 is of a type different from that of the telephone 2.

The audio playback unit 29 in the accessory device 8 generates the audio signals as described above. The accessory device 8 also comprises two mixers 30 and 31. The mixer 30 ensures that the voice conversation signals received from the other telephone 27 is mixed with the audio signals from the audio playback unit 29, such that the user 25 is able to listen to both signals simultaneously. The mixer 31, on the other hand, combines the audio signals from the audio playback unit 29 with the voice conversation signals coming from the user 25, and the combined signal is taken to the mobile telephone 2 instead of the voice conversation signal alone. In the mobile telephone 2 the combined signal is passed through a speech codec as usual and transmitted as a normal conversation signal via the network 28 to the other telephone 27, in which it is reproduced for the other person 26. This person is thus able to listen to the voice signals coming from the user 25 as well as the audio signal coming from the audio playback unit 29. An advantage of this solution is that no extra transmission capacity is needed in the network, which is used without any modifications. Actually, the mixer 31 is the only additional component needed in order to provide the facility of shared audio listening.

FIG. 4 shows an alternative solution. Instead of mixing the audio signals and the voice conversation signals in the mixer 31, the audio signals from the audio playback unit 29 are transmitted on a separate data channel parallel to the normal voice channel all the way through the network to the other telephone 27. In the telephone 27 or in an accessory device 32 connected thereto the data channel and the voice channel are combined in a mixer 33, so that the person 26 may listen to both signals. In this case the audio signals are transmitted in digitized form and this opens up the possibility of also compressing the audio data before transmission. This reduces the needed transmission capacity considerably. The accessory device 32 or the telephone 27 must then include means for decompressing or decoding the compressed data before they can be mixed with the voice signals in the mixer 33. These means may e.g. be similar to the audio playback unit 29 in the accessory device 8. A suitable compressing format is MP3. It should be noted that in this solution the voice channel may alternatively be removed and the voice sent as data as well. The solution may also be used even without a voice conversation taking part, i.e. the two persons just listen to the same audio signals without talking together.

An alternative to FIGS. 1 and 2 is shown in FIG. 5. Instead of obtaining the audio files through a personal computer, the wireless public network (i.e. in the shown example the GSM network) already used by the cellular telephone 2 for the standard two-way communication, is used also for the transfer of the audio files to the telephone. Thus the network is used for digital real time voice conversation as well as downloading of Internet non-real time audio signals (music, news, weather, books, etc.). The audio files downloaded through the GSM network (or other type of cellular network) may come from a dedicated server 13 connected to the Internet 12, as described above, or they may come from a WAP server connected directly to the GSM network. In the latter case the telephone must support WAP.

Again in this situation, the digitized and compressed audio files may either be stored in a memory for subsequent decompression and playback, or they may be "streamed down", as described above.

This solution is preferably used with networks providing relatively high data transmission rates. The bandwidth of the faster links in the public wireless network will allow even hi-fi music to be downloaded in reasonable times. As an example, MP3 files require 128 kbps. EDGE provides 384 kbps corresponding to 60 seconds per track, while WCDMA provides 2 Mbps corresponding to 120 seconds per track for a compact disc. A possibility of listening on-line, i.e. streaming, will also be possible. This will provide real mobile "on-demand" service.

When the audio signals are downloaded from a server to the mobile telephone through the network as shown in FIG. 5, a different embodiment of shared audio listening is possible. This embodiment is shown in FIG. 6, and it will be seen that the server 35 downloads the same audio signals to the two telephones 2 and 27. The downloading is initiated by the user 25 and he instructs the server to download the same data to the other telephone as well. In this case the accessory device 8 does not send the audio signals back to the telephone 2 but only via the mixer 30 to the user 25. Although not shown, the accessory device 32 will have audio playback means which could be similar to the audio playback unit 29. The audio signals transmitted from the server 35 will typically be compressed, and again a suitable compressing format is MP3. It should be noted that also in this solution the voice channel may alternatively be removed and the voice sent as data as well. The solution may also be used even without a voice conversation taking part, i.e. the two persons just listen to the same audio signals without talking together.

Finally, it should be noted that while the transmission of the audio files to the other telephone 27 in the above mentioned examples is taking place through the public network to which the phones are connected, a different transmission path may also be used. An example is shown in FIG. 5 in which the GSM phone 2 communicates with another telephone 21 via a Bluetooth link. This means that the audio files are downloaded to the telephone 2 through the Internet and the GSM network and then retransmitted from the telephone 2 to the telephone 21 via the Bluetooth link.

Although preferred embodiments of the present invention have been described and shown, the invention is not restricted thereto, but may also be embodied in other ways within the scope of the subject-matter defined in the following claims.

The invention claimed is:

1. A method of using a first mobile terminal together with at least one other mobile terminal over a communications network, the method comprising:
    configuring an audio playback unit in a first mobile terminal to receive, store and play audio signals;
    establishing a data channel connection through a communications network between the first mobile terminal and the at least one other mobile terminal;
    establishing a voice channel connection through the communications network between the first mobile terminal and the at least one other mobile terminal;
    audibly playing back audio signals by the audio playback unit in the first mobile terminal;
    transmitting the same audio signals by the audio playback unit over the first data channel to the at least one other mobile terminal; and
    audibly playing back the audio signals by the at least one other mobile terminal, wherein the audibly playing back of the audio signals in the at least one other mobile terminal occurs at least in part simultaneously with the audibly playing back of the audio signals by the audio playback unit of the first mobile terminal.

2. A method according to claim 1, further comprising:
    establishing a telephone conversation by transmitting contemporaneous voice signals over the voice channel connection; and
    simultaneously transmitting stored audio signals from the audio playback unit of the first mobile terminal over the communications network to the at least one other mobile terminal.

3. The mobile terminal according to claim 1, adapted to operate in a GSM network.

4. The mobile terminal according to claim 1, adapted to operate in a GPRS network.

5. The mobile terminal according to claim 1, adapted to operate in an EDGE network.

6. The mobile terminal according to claim 1, adapted to operate in a WCDMA network.

7. The method according to claim 1, further comprising using a digital audio player as the audio playback unit of the first mobile terminal.

8. The method according to claim 1, further comprising transmitting the audio signals in a form of a digitized and compressed audio file.

9. A method of using a first mobile terminal together with at least one other mobile terminal, the method comprising:
    configuring an audio playback unit in a first mobile terminal to receive, store and play audio signals;
    receiving and converting into digital form in the first mobile terminal, contemporaneous voice signals;
    mixing the contemporaneous voice signals and the stored audio signals; and
    modulating and transmitting the mixed contemporaneous voice and stored audio signals from the first mobile terminal to at least one other mobile terminal through a common channel in a connection in over a communications network.

10. A method according to claim 9, wherein the common channel comprises a normal telephone voice channel.

11. A method according to claim 9, wherein the common channel comprises a data channel.

12. A method of using a first mobile terminal together with at least one other mobile terminal, the method comprising:
    establishing a connection through a network between the first mobile terminal and at least one other mobile terminal;
    establishing a telephone conversation by transmitting contemporaneous voice signals between a first mobile terminal to at least one other mobile terminal over a channel in a connection in a communications network;
    transmitting audio signals received by an audio playback unit in the first mobile terminal from a service provider via the communications network to the at least one other mobile terminal; and
    transmitting the same audio signals from the service provider via the communications network to the at least one other mobile terminal.

13. A method according to claim 12, wherein the audio signals are transmitted in a form of a digitized and compressed audio file.

14. A method according to claim 13, wherein the digitized and compressed audio file is compressed in a MP3 format.

15. A communications system, comprising:
    a mobile telephone having an audio playback unit adapted to receive, store and play audio signals and a module adapted to receive, convert into digital form, modulate and transmit contemporaneous voice signals;
    at least one other communications device
    the audio playback unit operable to audibly play back stored audio signals and the mobile telephone operable to transmit the stored audio signals over a communications network to the at least one other communications device; and the at least one other communications device operable to audibly play back the audio signals, wherein the audible play back of the audio signals in the at least one other communications device occurs at least in part simultaneously with the audible play back of the audio signals in the mobile telephone.

16. The communications system according to claim 15, wherein the mobile telephone is adapted for use in a public network.

17. The communications system according to claim 15, wherein the mobile telephone is adapted for use in a wireless shortlink.

18. The mobile terminal according to claim 17, wherein the wireless shortlink comprises a Bluetooth connection.

19. The mobile terminal according to claim 17, wherein the wireless shortlink comprises an infrared connection.

20. The communications system according to claim 15, wherein the mobile telephone incorporates an integrated audio device operable to receive, store and play back audio signals.

21. An accessory device for use with a mobile terminal adapted to be used in a communications system comprising at least one other communications device, the accessory device comprising:

an audio playback unit adapted to receive, store and audibly play back audio signals through the mobile terminal; and a transmitter for initiating transmission of the audio signals to the at least one other communications device, such that said audio signals can be audibly played back in the at least one other communications device, wherein the audibly playing back of said audio signals in the at least one other communications device occurs at least in part simultaneously with audibly playing back of the audio signals in the mobile terminal.

* * * * *